(12) United States Patent
Kim

(10) Patent No.: US 10,315,647 B2
(45) Date of Patent: Jun. 11, 2019

(54) METHOD FOR CONTROLLING DRIVING OF VEHICLE USING DRIVING INFORMATION OF VEHICLE AND VEHICLE USING THE SAME

(71) Applicant: HYUNDAI MOTOR COMPANY, Seoul (KR)

(72) Inventor: Do Hee Kim, Seongnam-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 47 days.

(21) Appl. No.: 15/593,766

(22) Filed: May 12, 2017

(65) Prior Publication Data

US 2018/0126980 A1 May 10, 2018

(30) Foreign Application Priority Data

Nov. 8, 2016 (KR) .......................... 10-2016-0148372

(51) Int. Cl.
*B60W 20/40* (2016.01)
*B60W 40/09* (2012.01)
(Continued)

(52) U.S. Cl.
CPC ............ *B60W 20/40* (2013.01); *B60W 10/06* (2013.01); *B60W 10/08* (2013.01); *B60W 20/10* (2013.01);
(Continued)

(58) Field of Classification Search
CPC ........... B60W 20/40; B60W 30/18009; B60W 40/09; B60W 2540/30; G08G 1/0133; G08G 1/0137
See application file for complete search history.

(56) References Cited

U.S. PATENT DOCUMENTS 5,345,907 A * 9/1994 Matsuoka ............... B60K 31/00
123/399
5,383,431 A * 1/1995 Nishimura ............ F02D 11/105
123/399
(Continued)

FOREIGN PATENT DOCUMENTS

CN 101419677 A * 4/2009
CN 101419678 A * 4/2009
(Continued)

OTHER PUBLICATIONS

Carmona, Juan et al., "Data fusion for driver behavior analysis", Sensors 2015, vol. 15, www.mdpi.com/journal/sensors, pp. 25968 to 25991 (Year: 2015).*
(Continued)

*Primary Examiner* — Behrang Badii
*Assistant Examiner* — David A Testardi
(74) *Attorney, Agent, or Firm* — Brinks Gilson & Lione

(57) ABSTRACT

The present disclosure provides a method for controlling driving of a vehicle using driving information of the vehicle including: collecting, by a collector, driving data of the vehicle; extracting, by an extractor, ordinary driving characteristics and distinguishing driving characteristics of the vehicle from the collected driving data; classifying, by a classifier, driving tendency of the vehicle based on the extracted driving characteristics; and controlling, by a controller, driving of the vehicle based on the classified driving tendency. The ordinary driving characteristics includes an average speed of the vehicle, the distinguishing driving characteristics includes standard deviation of speed of the vehicle, and the driving tendency of the vehicle includes driving environment of the vehicle and driving propensity of a driver of the vehicle.

12 Claims, 9 Drawing Sheets

(51) Int. Cl.
　　　*G08G 1/01*　　　(2006.01)
　　　*B60W 30/18*　　(2012.01)
　　　*B60W 10/06*　　(2006.01)
　　　*B60W 10/08*　　(2006.01)
　　　*B60W 40/06*　　(2012.01)
　　　*B60W 20/10*　　(2016.01)

(52) U.S. Cl.
　　　CPC ...... *B60W 30/18009* (2013.01); *B60W 40/06* (2013.01); *B60W 40/09* (2013.01); *G08G 1/0133* (2013.01); *B60W 2520/10* (2013.01); *B60W 2530/14* (2013.01); *B60W 2550/141* (2013.01); *B60W 2550/142* (2013.01); *B60W 2720/40* (2013.01); *Y10S 903/93* (2013.01)

(56) References Cited

U.S. PATENT DOCUMENTS

| Patent/Pub No. | Date | Inventor | Class |
|---|---|---|---|
| 6,438,472 B1* | 8/2002 | Tano | G01C 21/26 701/25 |
| 6,865,475 B2* | 3/2005 | Willenbrock | G08G 1/0104 701/117 |
| 2002/0128751 A1* | 9/2002 | Engstrom | G05B 13/027 701/1 |
| 2009/0150314 A1 | 6/2009 | Engstrom et al. | |
| 2010/0198456 A1* | 8/2010 | Komori | B60W 40/09 701/33.4 |
| 2010/0274435 A1* | 10/2010 | Kondoh | B60W 40/09 701/31.4 |
| 2010/0305798 A1* | 12/2010 | Phillips | B60W 40/09 701/22 |
| 2012/0221170 A1* | 8/2012 | Tanoue | B60R 16/0236 701/1 |
| 2012/0283893 A1* | 11/2012 | Lee | G07C 5/008 701/1 |
| 2013/0096753 A1* | 4/2013 | Severinsky | B60H 1/004 701/22 |
| 2013/0166118 A1* | 6/2013 | Kim | B60W 10/06 701/22 |
| 2013/0325230 A1* | 12/2013 | Kim | B60W 10/08 701/22 |
| 2013/0325284 A1* | 12/2013 | Sato | G08G 1/0112 701/96 |
| 2014/0067175 A1* | 3/2014 | Cho | B60L 11/14 701/22 |
| 2014/0277972 A1* | 9/2014 | Jeon | B60W 50/10 701/51 |
| 2014/0297140 A1* | 10/2014 | Jeon | F16H 61/0213 701/55 |
| 2014/0358323 A1* | 12/2014 | Jeon | F16H 59/00 701/1 |
| 2014/0371949 A1* | 12/2014 | Jeon | B60W 50/10 701/1 |
| 2016/0009271 A1* | 1/2016 | Choi | B60W 40/09 701/22 |
| 2016/0046205 A1* | 2/2016 | Park | B60L 15/2063 701/22 |
| 2016/0082965 A1* | 3/2016 | Jeon | B60W 30/182 701/36 |
| 2018/0099658 A1* | 4/2018 | Ossareh | F02D 41/062 |

FOREIGN PATENT DOCUMENTS

| | | | |
|---|---|---|---|
| EP | 1780090 A1 * | 5/2007 | ............ B60W 40/09 |
| KR | 10-0747796 B1 | 8/2007 | |
| KR | 10-2012-0011620 A | 2/2012 | |
| KR | 10-2012-0114604 A | 10/2012 | |

OTHER PUBLICATIONS

Dharmaraj Ram Manohar, Ravi Shankar, "Journey Predictive Energy Management Strategy for a Plug-in Hybrid Electric Vehicle", PhD Thesis, Cranfield University, ProQuest Publication Year 2013, ProQuest Document ID 1929174484, 202 pages (Year: 2013).*

* cited by examiner

FIG. 4

| Driving environment | Average speed(α) | Average APS(β) | Average BPS(γ) |
|---|---|---|---|
| Street | α < a | β < a' | γ < a" |
| Arterial | a ≤ α ≤ b | a' ≤ β ≤ b' | a" ≤ γ ≤ b" |
| Expressway | b < α ≤ c | b' < β ≤ c' | b" < γ ≤ c" |

FIG. 5

| Driving tendency | Speed standard deviation(x) | APS standard deviation(y) | BPS standard deviation(z) |
|---|---|---|---|
| Eco | $x < d$ | $y < d'$ | $z < d''$ |
| Normal | $d \leq x \leq e$ | $d' \leq y \leq e'$ | $d'' \leq z \leq e''$ |
| Aggressive | $e < x \leq f$ | $e' < y \leq f'$ | $e'' < z \leq f''$ |

METHOD FOR CONTROLLING DRIVING OF VEHICLE USING DRIVING INFORMATION OF VEHICLE AND VEHICLE USING THE SAME

CROSS-REFERENCE TO RELATED APPLICATION

The present application claims priority to and the benefit of Korean Patent Application No. 10-2016-0148372, filed on Nov. 8, 2016, which is incorporated herein by reference in its entirety.

FIELD

The present disclosure relates to a control method for a vehicle, and more particularly, to a method for controlling driving of a vehicle using driving information of the vehicle and the vehicle using the same.

BACKGROUND

The statements in this section merely provide background information related to the present disclosure and may not constitute prior art.

An environmentally-friendly vehicle includes a fuel cell vehicle, an electric vehicle, a plug-in electric vehicle, and a hybrid vehicle, and typically includes a motor to generate driving force.

A hybrid vehicle, which is an example of the environmentally-friendly vehicle, uses an internal combustion engine and power of a battery together. In other words, the hybrid vehicle efficiently combines and uses power of the internal combustion engine and power of a motor.

The hybrid vehicle can consist of an engine, a motor, an engine clutch to adjust power between the engine and the motor, a transmission, a differential gear apparatus, a battery, a starter-generator that starts the engine or generates electricity by output of the engine, and wheels.

Further, the hybrid vehicle can consist of a hybrid control unit (HCU) for controlling an entire operation of the hybrid vehicle, an engine control unit (ECU) for controlling an operation of the engine, a motor control unit (MCU) for controlling an operation of the motor, a transmission control unit (TCU) for controlling an operation of the transmission, and a battery control unit (BCU) for controlling and managing the battery.

The battery control unit can be called a battery management system (BMS). The starter-generator can be called an integrated starter and generator (ISG) or a hybrid starter and generator (HSG).

The hybrid vehicle can be driven in a driving mode, such as an electric vehicle (EV) mode, which is an electric vehicle mode using only power of the motor, a hybrid electric vehicle (HEV) mode, which uses rotational force of the engine as main power and uses rotational force of the motor as auxiliary power, and a regenerative braking (RB) mode for collecting braking and inertial energy during driving by braking or inertia of the vehicle through electricity generation of the motor to charge the battery.

US Patent Application Publication No. US 2009/0150314 A1, which is a related art, may classify driving environment according to driving information of a vehicle to vary driving control of the vehicle. The related art may collect the vehicle data having driver characteristics to predict current driving environment and to adjust the vehicle performance based on the predicted driving environment.

SUMMARY

The present disclosure provides a method for controlling driving of a vehicle using driving information of the vehicle and the vehicle using the same which are capable of increasing driving efficiency (or driving control efficiency) of the vehicle.

One form of the present disclosure may provide the method for controlling driving of the vehicle using driving information of the vehicle, including: collecting, with a collector, driving data of the vehicle; extracting, with an extractor, ordinary driving characteristics and distinguishing driving characteristics of the vehicle from the driving data; classifying, with a classifier, driving tendency of the vehicle based on the driving characteristics; and controlling, with a controller, driving of the vehicle based on the driving tendency. The ordinary driving characteristics may include an average speed of the vehicle, the distinguishing driving characteristics may include standard deviation of speed of the vehicle, and the driving tendency of the vehicle may include driving environment of the vehicle and driving propensity of a driver of the vehicle.

The controller may include the collector, the extractor, and the classifier.

The extractor may detect the driving environment of the vehicle from the ordinary driving characteristics.

The extractor may detect the driving propensity of the driver from the distinguishing driving characteristic.

The controlling driving of the vehicle may include: controlling, with the controller, an on state or an off state of an engine included in a hybrid vehicle based on the driving tendency when the vehicle includes the hybrid vehicle.

The controlling driving of the vehicle may include: controlling, with the controller, an amount of creep torque for the vehicle based on the driving tendency when the vehicle includes an environmentally friendly vehicle.

The classifying driving tendency may include: adjusting, with the classifier, the classified driving tendency of the vehicle based on ratio information that indicates an existence ratio of an uphill road or a downhill road in the driving environment.

Another form of the present disclosure may provide the vehicle including: a collector configured to collect driving data of the vehicle; an extractor configured to extract ordinary driving characteristics and distinguishing driving characteristics of the vehicle from the driving data; a classifier configured to classify driving tendency of the vehicle based on the driving characteristics; and a controller configured to control driving of the vehicle based on the driving tendency. The ordinary driving characteristics may include an average speed of the vehicle, the distinguishing driving characteristics may include standard deviation of speed of the vehicle, and the driving tendency of the vehicle may include driving environment of the vehicle and driving propensity of a driver of the vehicle.

The controller may include the collector, the extractor, and the classifier.

The extractor may detect the driving environment of the vehicle from the ordinary driving characteristics.

The extractor may detect the driving propensity of the driver from the distinguishing driving characteristic.

The controller may control an on state or an off state of an engine included in the vehicle based on the driving tendency when the vehicle includes the hybrid vehicle.

The controller may control an amount of creep torque for the vehicle based on the driving tendency when the vehicle includes the environmentally friendly vehicle.

The classifier may adjust the classified driving tendency of the vehicle based on ratio information that indicates an existence ratio of an uphill road or a downhill road in the driving environment.

The method for controlling driving of the vehicle using driving information of the vehicle and the vehicle using the same according to some forms of the present disclosure may use detection of driving environment (e.g., road type) based on determination of a driving pattern using driving information of the vehicle, detection of a driver's propensity (e.g., uneconomical driving that is driving beyond a required driving load), or real-time correction according to a driving load such as a uphill road or a downhill road (i.e., correction of driving tendency of the vehicle when there is the uphill road or the downhill road in the driving environment) to perform energy efficiency maximization control such as a control that maintains a state of charge (SOC) of a battery of the vehicle or control of an operating mode of the vehicle.

Further, some forms of the present disclosure may vary driving control of the vehicle according to the driving environment of the vehicle and driving propensity (or driving behavior) of the vehicle driver. Therefore, transition of an unnecessary driving point of the vehicle (e.g., transition between a hybrid electric vehicle (HEV) mode and an electric vehicle (EV) mode) may be inhibited so that the vehicle travels at high fuel efficiency and energy management of the vehicle is improved.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 4 is a table illustrating a form of a step of extracting ordinary driving characteristics of the vehicle shown in FIG. 1;

FIG. 5 is a table explaining a form of a step of extracting distinguishing driving characteristics of the vehicle shown in FIG. 1;

Figure 1:
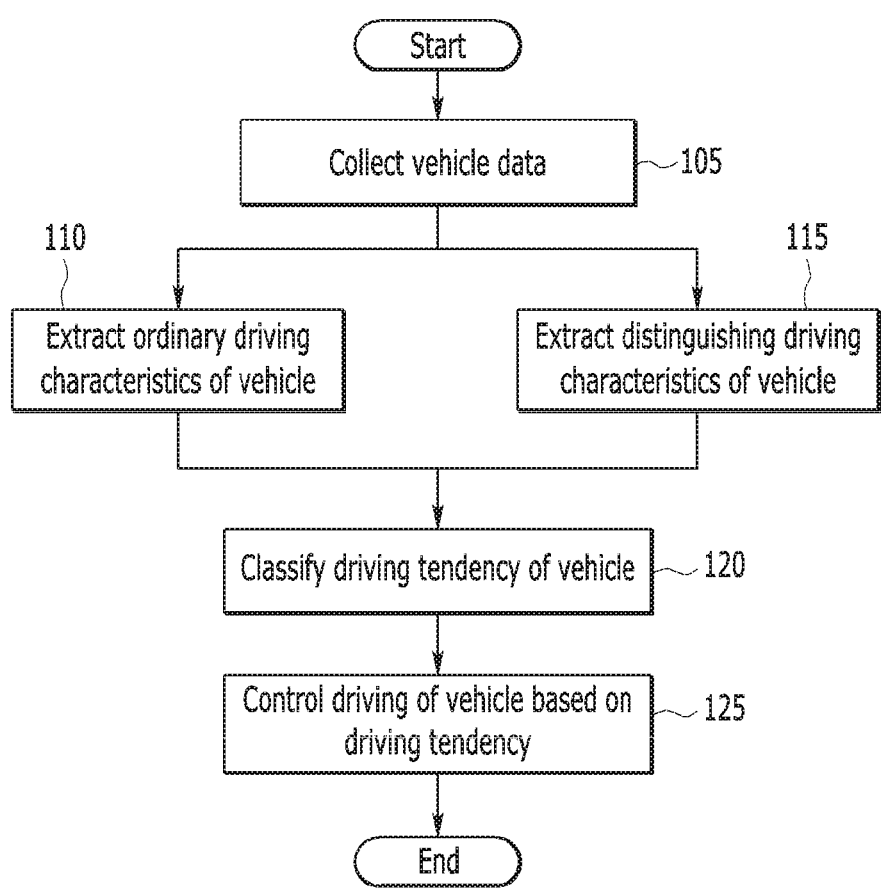
FIG. 1 is a flowchart explaining a method for controlling driving of a vehicle using driving information of the vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

When adjustment of vehicle performance is performed based on predicted driving environment that is driving environment (i.e., road type that is a city road, a main road, or a highway) classified based on only a vehicle speed, we have discovered the following.

The driving environment may be misclassified due to driving tendency of the vehicle driver. For example, when a reference speed exceeds a pre-classified reference speed due to the driver's aggressive driving tendency, the classified driving environment may be recognized as another driving environment, which may result in unnecessary control of the vehicle. In other words, as long as the driving tendency is not reflected in the adjustment of vehicle performance, unnecessary control may frequently appear.

In more detail, a control according to the predicted driving environment may be frequently performed due to the driving tendency. For example, a change of the driving environment may be repeated due to influence of the driving tendency regardless of a change of actual driving environment change so that unnecessary control occurs.

Repetition of unnecessary control may reduce driving control efficiency of the vehicle and may lead to a problem such as a drop in fuel efficiency or a drop in drivability of the vehicle. Therefore, control of the vehicle with unclear prediction of the driving environment may inhibit achievement of a goal of improving driving performance of the vehicle according to the driving environment.

Figure 2:
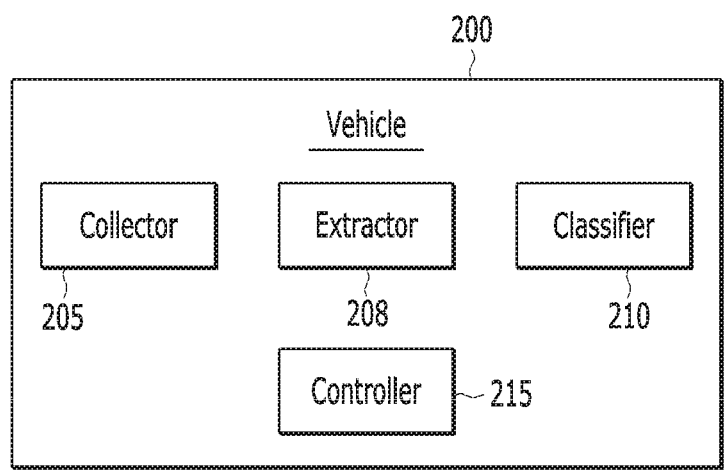
FIG. 2 is a block diagram illustrating the vehicle using the method for controlling driving of the vehicle.
Figure 3:
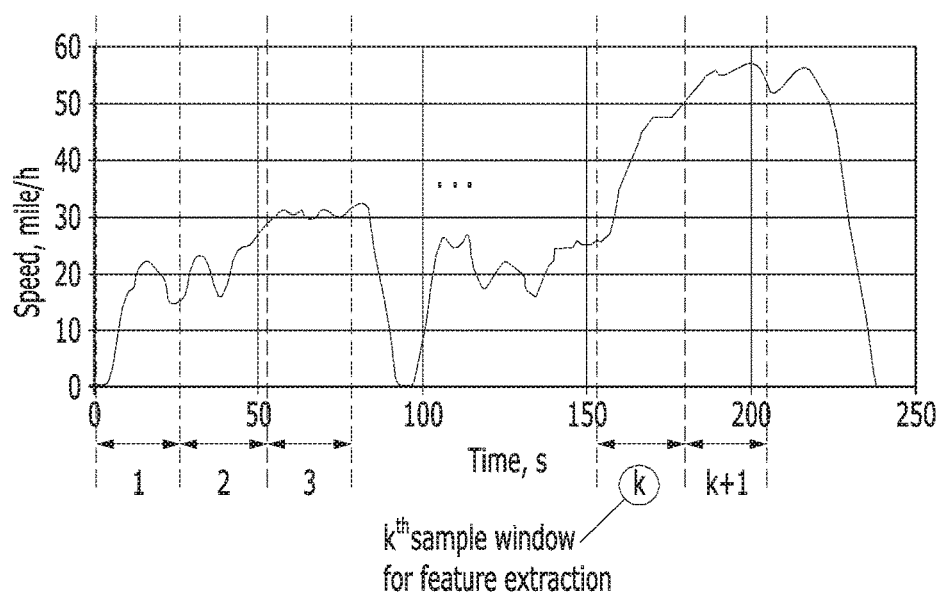
FIG. 3 is a graph explaining a form of a step of extracting driving characteristics of the vehicle shown in FIG. 1.
Figure 6:
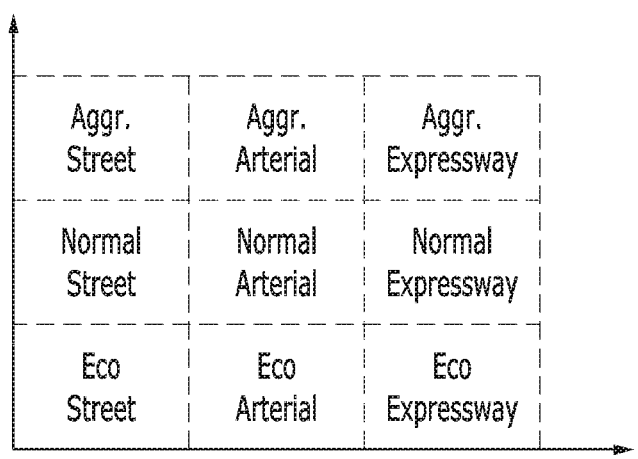
FIG. 6 is a graph illustrating a form of a step of synthetically classifying driving tendency of the vehicle shown in FIG. 1.
Figure 7:
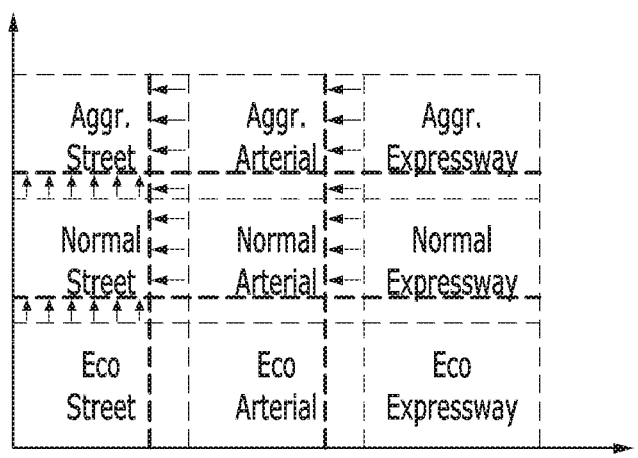
FIG. 7 is a graph explaining another form of the step of synthetically classifying driving tendency of the vehicle shown in FIG. 1.
Figure 8:
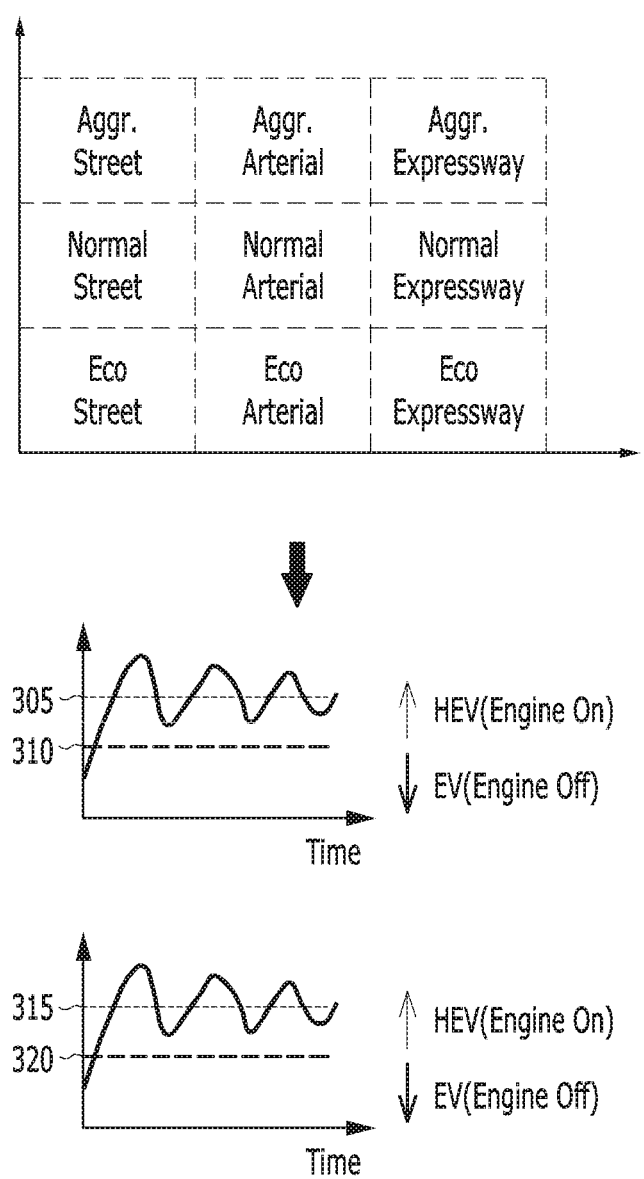
FIG. 8 is a graph explaining a form of a step of controlling driving of the vehicle based on driving tendency of the vehicle shown in FIG. 1.
Figure 9:
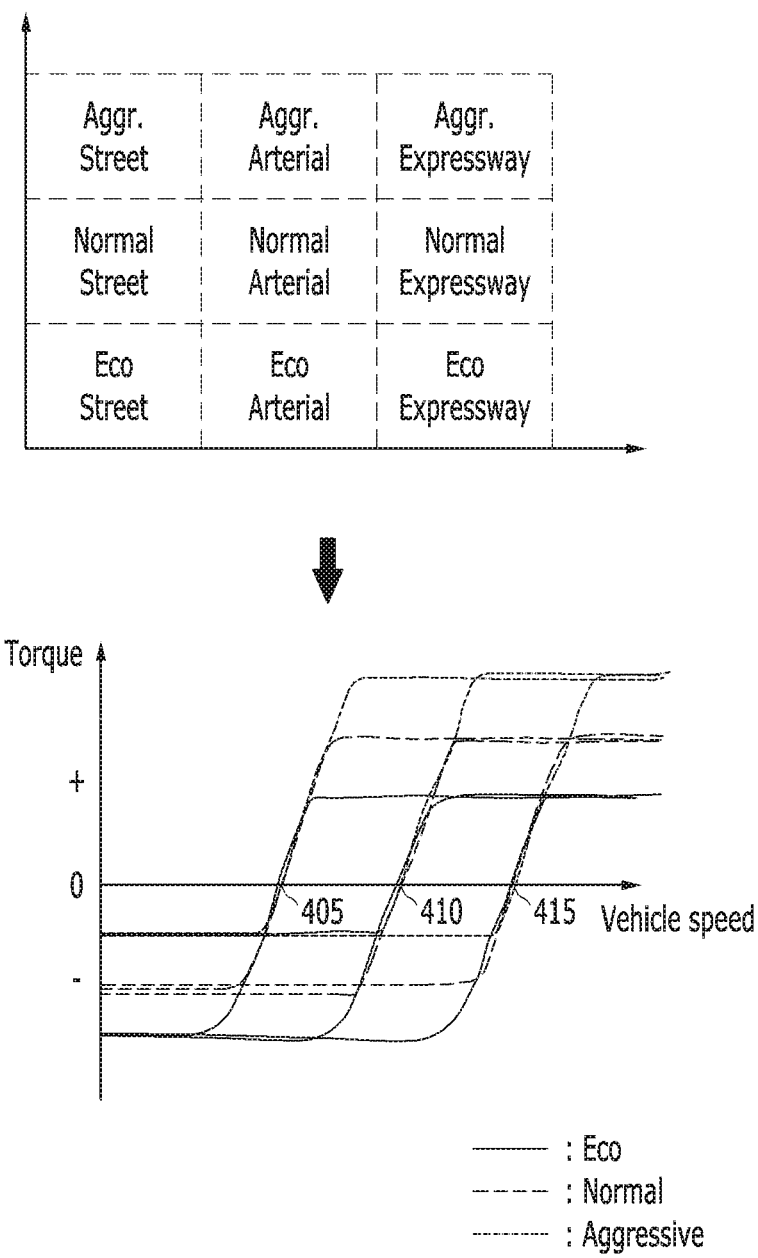
FIG. 9 is a graph explaining another form of the step of controlling driving of the vehicle based on driving tendency of the vehicle shown in FIG. 1.

FIG. 1 is a flowchart explaining a method for controlling driving of a vehicle using driving information of the vehicle according to some forms of the present disclosure. FIG. 2 is a block diagram illustrating the vehicle using the method for controlling driving of the vehicle according to some forms of the present disclosure. FIG. 3 is a graph explaining an exemplary embodiment of a step of extracting driving characteristics of the vehicle shown in FIG. 1. FIG. 4 is a table illustrating a step of extracting ordinary driving characteristics of the vehicle shown in FIG. 1. FIG. 5 is a table explaining a step of extracting distinguishing driving characteristics of the vehicle shown in FIG. 1. FIG. 6 is a graph illustrating a step of synthetically classifying driving tendency of the vehicle shown in FIG. 1. FIG. 7 is a graph explaining the step of synthetically classifying driving tendency of the vehicle shown in FIG. 1. FIG. 8 is a graph explaining a step of controlling driving of the vehicle based on driving tendency of the vehicle shown in FIG. 1. FIG. 9 is a graph explaining the step of controlling driving of the vehicle based on driving tendency of the vehicle shown in FIG. 1.

Referring to FIGS. 1 and 2, in a collecting step 105, a collector 205 of the vehicle 200 may collect driving data (or driving information) of the vehicle. The driving data may include the vehicle speed, the vehicle acceleration, an acceleration pedal position sensor (APS) value of the vehicle, and a brake pedal position sensor (BPS) value of the vehicle. Type information of a road, driving environment information, or driving propensity information of the vehicle driver may be detected from the driving data.

The vehicle 200 may include the collector 205, an extractor 208, a classifier 210, and a controller 215.

In another form of the present disclosure, the controller 215 may include the collector 205, the extractor 208, and the classifier 210. For example, the controller 215 may be one or more microprocessors operated by a program or hardware including the microprocessor. The program may include a series of commands for executing the method for controlling driving of the vehicle using driving information of the vehicle according to some forms of the present disclosure. The controller 215 may control an entire operation of the vehicle 200.

As shown in FIG. 3, the extractor 208 may extract driving characteristics of the vehicle 200 after dividing the driving data such as the vehicle speed by a predetermined time window.

According to a first extraction step 110, the extractor 208 may extract ordinary driving characteristics (or ordinary driving pattern) of the vehicle 200 from the collected driving data.

As shown in FIG. 4, the extractor 208 may extract the ordinary driving characteristics using an average value of the collected driving data. The average value may be obtained by using a method such as moving average which is calculated in real time by continuously collecting data during a predetermined time interval, and the average value may provide information having a general tendency. For example, a type of driving environment may be classified according to average speed (or an average value of the vehicle speed), an average value of the APS value, or an average value of the BPS value (or a combination of the average value of the vehicle speed, the average value of the APS value, and the average value of the BPS value). For example, the type of driving environment may include road types such as a street, an arterial, and an expressway. The extractor 208 may detect the driving environment of the vehicle 200 from the ordinary driving characteristics.

Threshold values (a, b, c, a', b', c', a", b", and c") for classifying the driving environment in FIG. 4 may be determined in advance by test and analysis.

According to a second extraction step 115, the controller 215 may extract the distinguishing driving characteristics of the vehicle 200 from the collected driving data.

As shown in FIG. 5, the extractor 208 may extract the distinguishing driving characteristics of the vehicle 200 using a standard deviation value of the collected driving data. Because the standard deviation value represents a deviation from the moving average, characteristic variation during driving of the vehicle may be detected. For example, propensity (e.g., economical, normal, and aggressive) of the driver of the vehicle 200 included in driving tendency may be classified based on standard deviation of the vehicle speed, standard deviation of the APS value, or standard deviation of the BPS value (or a combination of the standard deviation of the speed, the standard deviation of the APS value, and the standard deviation of the BPS value). Driving of the vehicle with a change over a certain value may be classified as driving of the vehicle having high aggressiveness. The extractor 208 may detect the propensity of the driver of the vehicle 200 from the distinguishing driving characteristic.

Threshold values (d, e, f, d', e', f', d", e", and f") that classify the driving tendency in FIG. 5 may be determined in advance by test and analysis.

According to a classification step 120, the classifier 210 may synthetically classify the driving tendency of the vehicle 200 based on the extracted driving characteristics.

As shown in FIG. 6, the classifier 210 may generate synthetic driving tendency of the vehicle by combining the ordinary driving characteristics and the distinguishing driving characteristics extracted in the first extracting step 110 and the second extracting step 115. The synthetic driving tendency may be stored as a map table in storage included in the classifier 210. In FIG. 6, a horizontal axis may indicate the ordinary driving characteristics and a vertical axis may indicate the distinguishing driving characteristics.

In another form of the present disclosure, the classifier 210 may change the synthetic driving tendency when there are a lot of uphill roads or downhill roads in the driving environment. In more detail, the classifier 210 may correct the classified driving tendency of the vehicle based on ratio information that indicates an existence ratio of an uphill road or a downhill road in the driving environment.

For example, the standard deviation value of the distinguishing driving characteristic may increase so that the driving tendency proceeds in an aggressive direction as shown in FIG. 7 when the vehicle frequently travels along an uphill road or a downhill road. Also, in the case of the uphill road, the average value of the ordinary driving characteristics may be increased, and in the case of the downhill road, the average value of the ordinary driving characteristics may be reduced as shown in FIG. 7. Therefore, in determining current driving tendency, a boundary classifying the driving tendency (or a boundary classifying tendency elements included in the driving tendency) may be adjusted according to the existence ratio of the uphill road or the downhill road included in the driving environment. In more detail, a threshold value classifying the driving tendency according to the existence ratio of the uphill road or the downhill road in the driving environment may be adjusted so that the synthetic driving tendency of the vehicle is adjusted.

According to a control step 125, the controller 215 may control driving of the vehicle 200 based on the classified driving tendency. As a result, driving performance of the vehicle 200 may be improved.

When the vehicle 200 is a hybrid vehicle (or a hybrid electric vehicle), the controller 215 may adjust a transition reference line between a hybrid electric vehicle (HEV) mode and an electric vehicle (EV) mode based on the synthetic driving tendency of the vehicle as shown in FIG. 8. The vehicle 200 may enter into the HEV mode for operating an engine of the hybrid vehicle when the vehicle 200 is in a mode equal to or greater than a transition reference value between the HEV mode and the EV mode, and the vehicle 200 may maintain the EV mode turning off the engine when the vehicle 200 is in a mode less than the transition reference value. In a graph below in FIG. 8, a horizontal axis may indicate a time and a vertical axis may indicate the vehicle speed, the driver requested torque, or the driver requested power that is the transition reference value.

The hybrid vehicle may use the engine (e.g., a diesel engine) and a motor (or a driving motor) as power sources, and may include an engine clutch existing between the engine and the motor so that the hybrid vehicle may be operated in the EV mode in which the hybrid vehicle travels by the motor in a state where the engine clutch is opened, and in the HEV mode in which the hybrid vehicle is capable of travelling by both the motor and the engine in a state where the engine clutch is closed.

Reference numeral 305 in FIG. 8 may indicate the transition reference value when the driving propensity of the driver is normal and the road type is the street, and reference numeral 310 in FIG. 8 may indicate the transition reference value when the driving propensity of the driver is aggressive and the road type is the street. Reference numeral 315 in FIG. 8 may indicate the transition reference value when the driving propensity of the driver is normal and the road type is the arterial road, and reference numeral 320 in FIG. 8 may indicate the transition reference value when the driving propensity of the driver is aggressive and the road type is the arterial road.

The driving tendency of the driver may be determined as aggressiveness based on the synthetic driving tendency when the driving propensity of the driver is aggressive so that the transition reference value may be lowered. Therefore, because the hybrid vehicle 200 is maintained in the HEV mode (i.e., the engine included in the vehicle is turned on), unnecessary transition between the HEV mode and the EV mode may be inhibited so that an off state of the engine that has low efficiency is avoided. As a result, the exemplary embodiment of the present disclosure may have a fuel consumption reduction effect.

In more detail, in order to prevent the engine from being unnecessarily turned on or off, control for turning the engine on may be maintained when the driver who is determined as an aggressive driver drives the vehicle 200 along a street in a downtown. The EV mode may be maintained when the driver who is determined as a normal driver drives the vehicle 200 along an expressway, thereby preventing deterioration of fuel efficiency.

However, when there is only classification of the driving environment and the driving tendency of the driver is aggressive, unnecessary transition between the HEV mode and the EV mode (i.e., an on state or an off state of the engine) may be repeated, which may lead to a drop in fuel efficiency of the vehicle.

In another form of the present disclosure, when the vehicle 200 is an environmentally friendly vehicle including the hybrid electric vehicle or an electric vehicle, the controller 215 may vary (or control) an amount of creep torque for the environmentally friendly vehicle based on the synthetic driving tendency as shown in FIG. 9. The creep torque may refer to a torque generated when the driver does not step on an accelerator pedal.

Reference numeral 405 of FIG. 9 may indicate the vehicle speed for shifting (or moving) a positive (+) amount of the creep torque to a negative (−) amount of the creep torque when the road type is the street, reference numeral 410 of FIG. 9 may indicate the vehicle speed shifting a positive (+) amount of the creep torque to a negative (−) amount of the creep torque when the road type is the arterial road, and reference numeral 415 of FIG. 9 may indicate the vehicle speed shifting a positive (+) amount of the creep torque to a negative (−) amount of the creep torque when the road type is the expressway.

The amount of creep torque according to the vehicle speed may be varied based on the driving environment. Phase of the creep torque may be changed from positive (+) phase to negative (−) phase at low speed of the vehicle when the road type is the street.

When the driving propensity of the driver is determined as aggressiveness based on the synthetic driving tendency, the positive (+) amount of the creep torque may be increased by control of the controller 215 and the negative (−) amount of the creep torque may be decreased by control of the controller 215. When the driving propensity of the driver is determined as economy based on the synthetic driving tendency, the positive (+) amount of the creep torque may be decreased and the negative (−) amount of the creep torque may be increased. Accordingly, a regenerative braking amount of the vehicle 200 may be increased when the driving propensity of the driver is economical so that the vehicle collects more energy and the vehicle has high fuel efficiency, and reacceleration response of the vehicle may become high when the driving propensity of the driver is aggressive so that driving performance of the vehicle is improved.

The components, "~ unit", block, or module which are used here may be implemented in software such as a task, a class, a subroutine, a process, an object, an execution thread, or a program which is performed in a predetermined region in the memory, or hardware such as a field programmable gate array (FPGA) or an application-specific integrated circuit (ASIC), and may be performed with a combination of the software and the hardware. The components, '~ part', or the like may be embedded in a computer-readable storage medium, and some part thereof may be dispersedly distributed in a plurality of computers.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for controlling driving of a vehicle using driving information of the vehicle, comprising:
    collecting, with a collector, driving data of the vehicle;
    extracting, with an extractor, ordinary driving characteristics and distinguishing driving characteristics of the vehicle from the driving data of the vehicle, wherein the ordinary driving characteristics of the vehicle comprises an average speed of the vehicle and the distinguishing driving characteristics of the vehicle comprises a standard deviation of speed of the vehicle;
    classifying, with a classifier, driving tendency of the vehicle based on the ordinary driving characteristics and the distinguishing driving characteristics of the vehicle, wherein the driving tendency of the vehicle is determined based on driving environment of the vehicle and driving propensity of a driver of the vehicle, and the driving propensity of the driver of the vehicle is determined based on the standard deviation of the speed of the vehicle; and
    controlling, with a controller, driving of the vehicle based on the driving tendency of the vehicle,
    wherein classifying the driving tendency of the vehicle comprises:
        adjusting, with the classifier, the driving tendency of the vehicle based on information corresponding to a number of uphill roads or downhill roads in the driving environment.

2. The method of claim 1, wherein the controller comprises the collector, the extractor, and the classifier.

3. The method of claim 1, wherein extracting, with the extractor, the ordinary driving characteristics of the vehicle comprises:
    detecting, with the extractor, the driving environment of the vehicle from the ordinary driving characteristics of the vehicle.

4. The method of claim 1, wherein extracting, with the extractor, the distinguishing driving characteristics of the vehicle comprises:

detecting, with the extractor, the driving propensity of the driver from the distinguishing driving characteristic of the vehicle.

5. The method of claim 1, wherein controlling driving of the vehicle comprises:
controlling, with the controller, an on-state and an off-state of an engine included in the vehicle based on the driving tendency of the vehicle, wherein the vehicle includes a hybrid vehicle.

6. The method of claim 1, wherein controlling driving of the vehicle comprises:
controlling, with the controller, an amount of creep torque for the vehicle based on the driving tendency of the vehicle, when the vehicle is a hybrid electric vehicle or an electric vehicle.

7. A vehicle comprising:
a collector configured to collect driving data of the vehicle;
an extractor configured to extract ordinary driving characteristics and distinguishing driving characteristics of the vehicle from the driving data of the vehicle, wherein the ordinary driving characteristics comprises an average speed of the vehicle and the distinguishing driving characteristics comprises standard deviation of speed of the vehicle;
a classifier configured to classify driving tendency of the vehicle based on the ordinary driving characteristics and the distinguishing driving characteristics of the vehicle, wherein the driving tendency of the vehicle is determined based on driving environment of the vehicle and driving propensity of a driver of the vehicle and the driving propensity of the driver of the vehicle is determined based on the standard deviation of the speed of the vehicle; and
a controller configured to control driving of the vehicle based on the driving tendency of the vehicle,
wherein the classifier is configured to adjust the driving tendency of the vehicle based on information corresponding to a number of uphill roads or downhill roads in the driving environment.

8. The vehicle of claim 7, wherein the controller comprises the collector, the extractor, and the classifier.

9. The vehicle of claim 7, wherein the extractor is configured to detect the driving environment of the vehicle from the ordinary driving characteristics of the vehicle.

10. The vehicle of claim 7, wherein the extractor is configured to detect the driving propensity of the driver from the distinguishing driving characteristic of the vehicle.

11. The vehicle of claim 7, wherein the controller is configured to control an on-state and an off-state of an engine included in the vehicle based on the driving tendency of the vehicle, wherein the vehicle comprises a hybrid vehicle.

12. The vehicle of claim 7, wherein the controller is configured to control an amount of creep torque for the vehicle based on the driving tendency of the vehicle, wherein the vehicle is a hybrid electric vehicle or an electric vehicle.

* * * * *